United States Patent [19]
Hamilton et al.

[11] 3,884,324
[45] May 20, 1975

[54] MOUNTING FOR SEISMIC VIBRATOR

[75] Inventors: Ferris F. Hamilton, Denver; James S. Johnson, Evergreen, both of Colo.

[73] Assignee: Hamilton Brothers Oil Company, Denver, Colo.

[22] Filed: Aug. 11, 1972

[21] Appl. No.: 279,880

[52] U.S. Cl. .............................. 181/114; 181/121
[51] Int. Cl. ............................................. G01v 1/14
[58] Field of Search ........ 181/.5 EC, .5 VM, .5 XC, 181/114, 116, 121

[56] References Cited
UNITED STATES PATENTS

| | | | |
|---|---|---|---|
| 3,159,233 | 12/1964 | Clynch | 181/.5 EC |
| 3,405,780 | 9/1968 | Coburn | 181/.5 EC |
| 3,658,148 | 4/1972 | Clynch | 181/114 |
| 3,690,402 | 9/1972 | Stafford | 181/.5 VM |
| 3,777,843 | 12/1973 | Fair et al. | 181/114 |

*Primary Examiner*—Maynard R. Wilbur
*Assistant Examiner*—H. A. Birmiel

[57] ABSTRACT

A seismic exploration vehicle includes a main frame upon which a vibrator assembly and control cab are positioned and front and rear powered tractors connected to the main frame for desired pivotal movement relative thereto. The vehicle is quickly and easily assembled or disassembled into five basic component parts for air transportation and to facilitate ready replacement of damaged parts without undue downtime. Each tractor is provided with a unique control stick for complete operation of the associated tractor, and the control cab is provided with an identical control stick which is operably connected to the control sticks on the tractors when the vehicle is assembled so that the operation of the vehicle can be controlled from either tractor or from the control cab. The vibrator assembly includes a vibrator mass which is reciprocal at a desired frequency by an operator controlled hydraulic system. The mass is isolated from the remainder of the vehicle by an air suspension system which damps both horizontal and upward vertical force components in such a way as to concentrate the application of force in a downward direction to most efficiently transmit seismic waves into the earth.

9 Claims, 19 Drawing Figures

MOUNTING FOR SEISMIC VIBRATOR

The present invention generally relates to apparatus for generating seismic waves in geophysical exploration and more particularly to a highly mobile vehicle assembly for transporting a seismic vibrator assembly, and to an improved seismic vibrator assembly capable of generating maximum seismic energy in relation to the mass.

Geophysical exploration utilizing seismic waves in the earth is a well-known technique for determination of subsurface rock formations. Briefly, it comprises initiating a seismic impulse at or near the surface of the earth and recording signals generated as a result of the seismic waves at one or more points more or less equally spaced from the point of origin of the seismic impulse. The recordation must permit measurement of the time elapsed between the instant of the origination of the impulse and the generation of signals as they pass through the subsequent earth movement. The original impulse will set up elastic waves that are transmitted through the earth. Any discontinuity or variation of structure within the earth will reflect and/or refract a portion of the energy in the wave so that a recordation of the signals from the receiving point will comprise a number of arriving waves, each derived from the original impulse and each differing from the other in time of arrival, magnitude and wave-shape or all three.

It is sometimes desired that a number of seismic waves be initiated at spaced locations and at short time intervals; also, it is frequently necessary that the seismic waves be initiated in remote areas where the terrain is un-negotiable or practically so, particularly by conventional wheeled vehicles. Even so, it has been customary in the past to mount the seismic vibrator units on the beds of conventional trucks which are capable of transporting the vibrator unit between working locations in negotiable areas. Examples of such seismic exploration units can be found in U.S. Pat. No. 3,327,287 of J. D. Ball, et al., U.S. Pat. No. 3,306,391 of M. G. Bays, U.S. Pat. No. 3,367,443 of W. H. Mayne, U.S. Pat. No. 2,772,746 of E. Merten and U.S. Pat. (Reissue) No. 26,825 of J. T. Kenney. As can be appreciated, however, it would be preferable that the transporting vehicle for the vibrator have the capability of negotiating very rough or uneven terrain, or in the event the terrain, is un-negotiable, be light enough so that it can be air-lifted into an exploration area.

In most seismic exploration units of the aforementioned type, the vibrator is anchored to the vehicle so that when the vibrator assembly is operated, the vibrating mass, will have the tendency to cause the transporting vehicle to vibrate with the mass. Thus, the mass when vibrating lifts a portion of the weight of the vehicle with each reciprocating stroke thereby depleting the energy with which the vibrator induces the seismic waves into the earth. Attempts have been made to isolate the vibrating mass from the supporting body of the truck or similar transporter as can be evidenced by U.S. Pat. No. 3,159,232 of D. W. Fair, U.S. Pat. No. 3,280,935 of G. L. Brown, U.S. Pat. No. 3,205,971 of F. Clynch and U.S. Pat. No. 3,159,233 of F. Clynch, et al. By isolating the vibrating mass from the supporting body to minimize the weight which must be lifted by the mass, it has been found that seismic waves can be generated in a more efficient manner. However, the means for isolating the mass from the vehicle is critical in that there are horizontal as well as vertical and oscillatory force components which must be buffered or damped to insure that the vibrations of the mass are uniformly directed into the earth.

The seismic exploration vehicle of the present invention is a relatively light, tracked vehicle consequently adapted to negotiate most any type of terrain. It is also adapted for use in those areas that are un-negotiable by available land roving seismic vehicles in that it is capable of being quickly and easily assembled and disassembled into a minimum number of component parts each light enough for air transportation, as by helicopter, to the exploration site.

The seismic exploration vehicle has a central main frame that supports the vibrator assembly and a control cab from which the vehicle and the vibrator can be operated. The main frame is connected to front and rear tractor units in a manner such that the front tractor is universally movable relative to the main frame and the rear tractor is free to pivot about a horizontal transverse axis so that the entire vehicle can negotiate most rough and uneven terrains.

The vehicle can be operated from either tractor or from the control cab in that the control cab is provided with a novel control stick which is connected to identical control sticks on the front and rear tractors. The control stick on each tractor can be disconnected from the control stick in the control cab so that when it is desired to use one of the tractors independently of the other, either tractor can quickly and easily be disconnected from the main frame and driven separately to other locations. This also facilitates rapid assembly and disassembly of the vehicle.

An important feature of the seismic exploration vehicle resides in the vibrator unit. The unit is provided with a mass that can be linearly reciprocated to produce seismic waves through a base plate operatively connected to the mass so that it can be driven into and out of engagement with the ground. The vibrator mass is mounted on an inner frame that is isolated from the remainder of the seismic vehicle through a unique arrangement of air bags located above and in surrounding relation to the mass whereby vertical as well as horizontal reactionary vibrations and forces are damped and absorbed to prevent the violent vibratory forces of the mass from being transmitted into the remainder of the vehicle and concentrate them in a vertical direction into the earth. In order to increase the efficiency of the vibrator, it is mounted on a rocker frame whereby the driving force of the mass can be directed substantially normally into the earth regardless of whether or not the ground is level at the exploration site.

Accordingly, it is an object of the present invention to provide a new and improved seismic exploration vehicle having the ability to negotiate extremely uneven terrain.

It is another object of the present invention to provide a seismic exploration vehicle that can quickly and easily be disassembled into basic component parts which are light enough to be air transported to remote locations.

It is another object of the present invention to provide a seismic exploration vehicle which has two independently driven, tracked vehicles that can be completely controlled from a common control or which may be independently controlled from individual controls on the separate tracked vehicles.

It is another object of the present invention to provide a seismic exploration vehicle having a main frame for supporting the vibrating unit and front and rear tractors which are connected to the main frame so that the front tractor is capable of universal movement relative to the main frame and the rear tractor is capable of pivotal movement about a horizontal transverse axis to enable the vehicle to negotiate most any type of terrain.

It is still another object of the present invention to provide a seismic exploration vehicle having a seismic vibrating unit in which vibrations of the mass are isolated from the remainder of the vehicle.

It is still another object of the present invention to provide a vibrating mass assembly having an inner frame on which the vibratory mass is mounted for reciprocating movement and an outer frame connected to the inner frame by shock absorbing means in such a way that the vibrations of the mass and inner frame are most effectively isolated from the outer frame.

Other objects, advantages and features of the present invention will become more readily appreciated and understood from the following detailed description when taken in conjunction with the accompanying drawings, in which:

Figure 1:
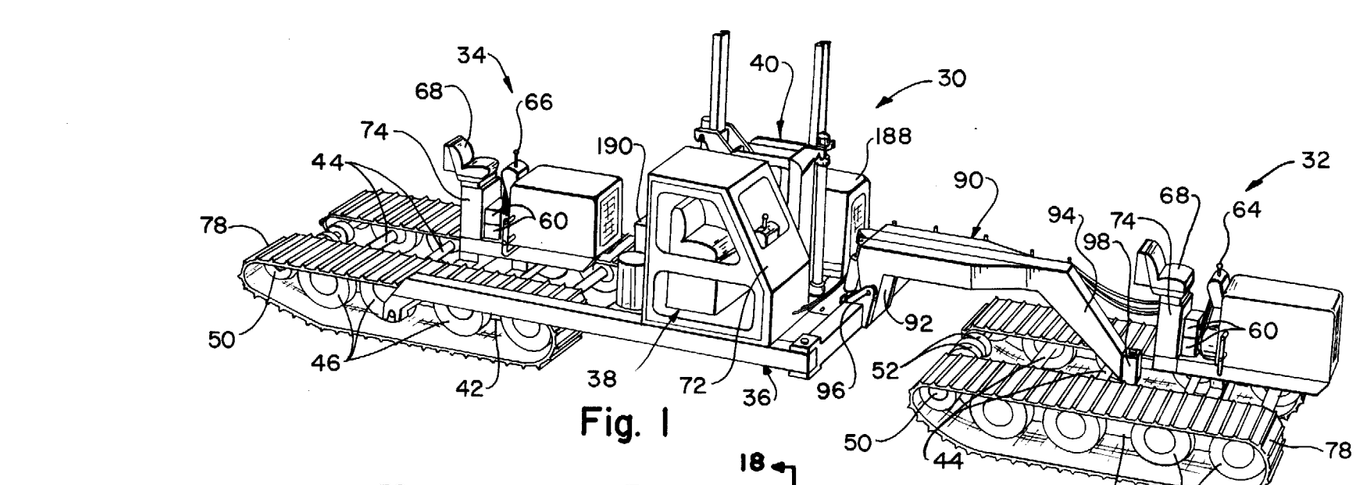
FIG. 1 is a perspective view of the seismic vehicle of the present invention.
Figure 2:
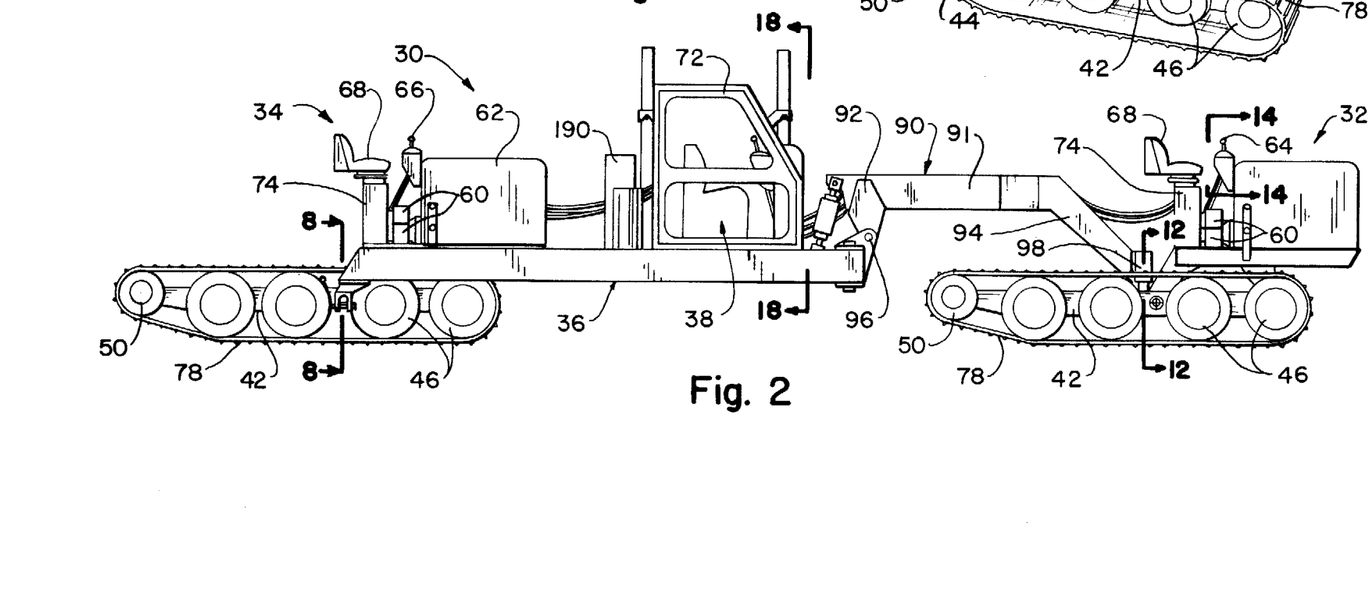
FIG. 2 is a side elevational of the seismic vehicle of FIG. 1.
Figure 3:
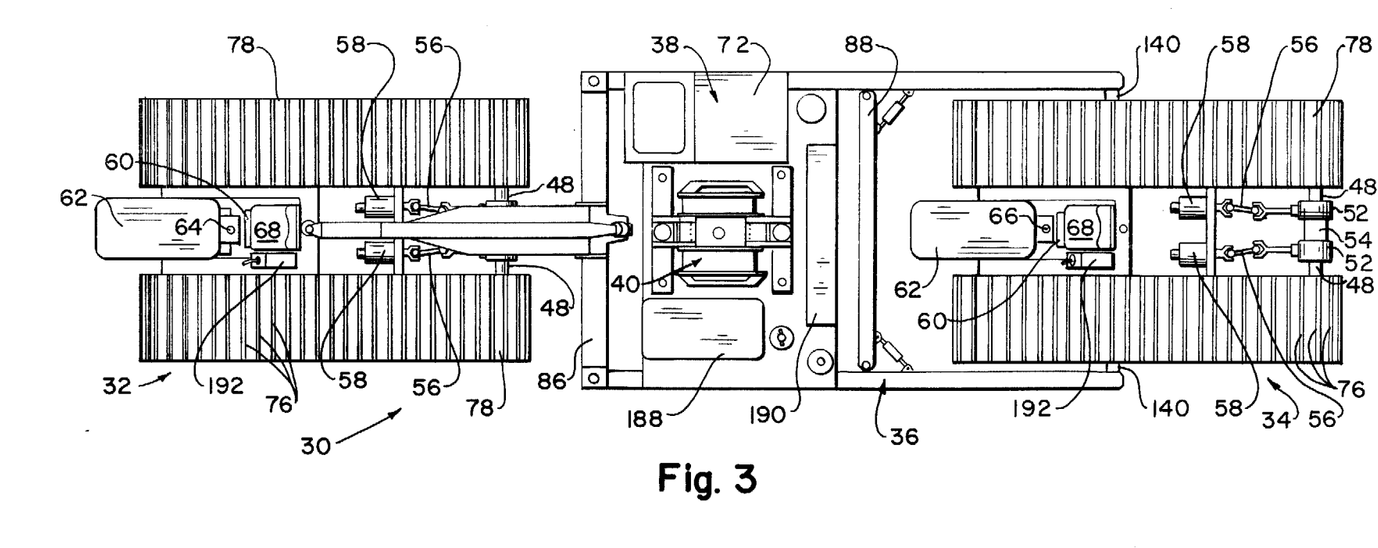
FIG. 3 is a top plan view of the seismic vehicle of FIG. 1.
Figure 4:
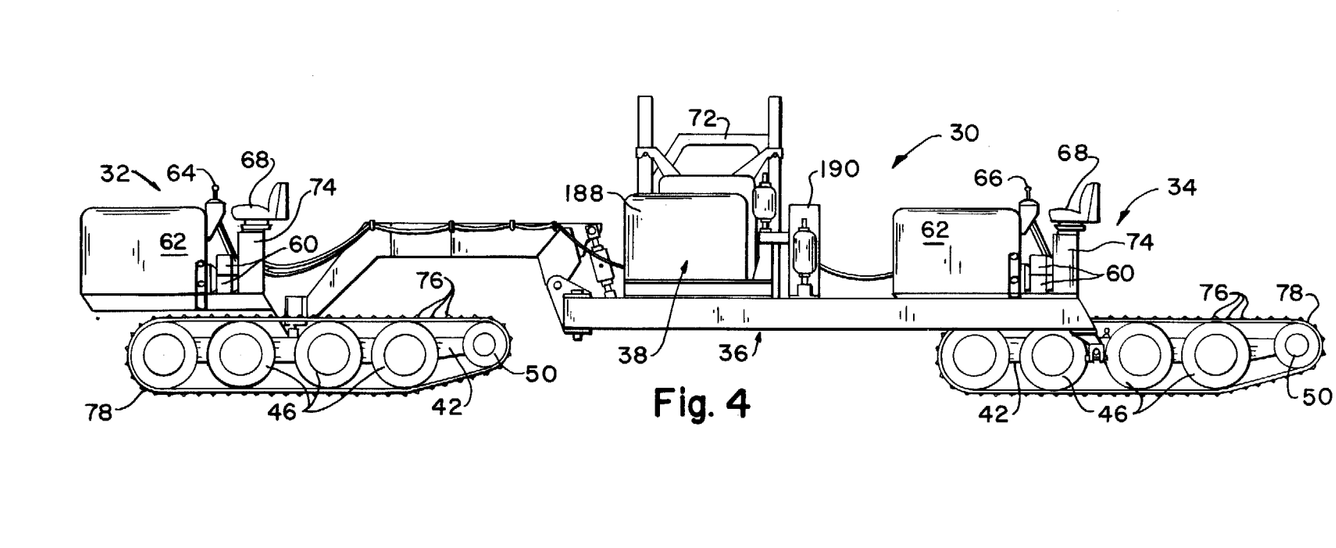
FIG. 4 is a side elevation showing the opposite side of the seismic vehicle from that shown in FIG. 2.

In the preferred form, the seismic exploration vehicle 30 of the present invention is seen in FIG. 1 to include a front tractor 32, a rear tractor 34, and a main intermediate frame 36 for an operations unit 38 and a vibrator assembly 40. The basic structure of the tractors 32 and 34 as best seen in FIGS. 1 through 5, is identical and like parts are correspondingly enumerated. Each includes a base frame 42 having four transverse axles 44 in tandem journaled therein that support bogey wheels 46 on either side of the base frame 42. The bogey wheels may be most any type of conventional wheel but preferably are conventional inflatable tires as used on cars or trucks for reasons to be explained hereinafter. A rear portion of each base frame 42 supports laterally extending drive shafts 48 having drive sprockets 50 on their outermost ends. The inner end of each drive shaft 48 is operably connected to a gear box 52 which is supported by a common housing 54, and each gear box is connected by auxiliary drive shafts 56 to hydraulic motors 58 mounted on a transverse frame member of the base frame 42. The hydraulic motors 58 are in turn operably connected by hoses to hydraulic pumps 60 that are run by a gasoline engine 62. The hydraulic system for each tractor is conventional and, as such, forms no part of the present invention so that a detailed description thereof is not deemed necessary. The pumps 60 on the front and rear tractors are controlled by control levers or sticks 64 and 66, respectively, adjacent to the operator's seat 68 on the tractor and, as will be explained later, the control stick members 64 and 66 on the tractors are operably connected together through a control stick member 70 in a control cab 72 on the operations unit 38 so that the two tractors can be operated as a unit from any one of three locations. The operator's seat on each tractor is mounted rearwardly to the engine 62 and on the top of the hydraulic reservoir 74 for the hydraulic system used to drive each tractor. The drive sprockets 50 are disposed to engage cross bars 76 which are part of two conventional endless, ground-engaging drive tracks 78 that pass around the drive sprocket and each associated bogey wheel 46 whereby rotational movement of the sprocket drives the track to advance the tractor either in a forward or rearward direction. The tracks can be removed from the tractor so that the tractor can be towed along any roadway and for this reason, it is preferable that the bogey wheels be conventional car or truck tires mounted on wheels. It can be appreciated that each tractor is comprised of a minimum number of parts so as to be very light, yet is durable and strong enough to haul heavy seismic vibrator equipment as will become clear with the description hereinafter. In one actual embodiment of the tractors, when used independently, they each had a ground pressure of 0.55 psi and when used as a complete seismic vehicle the front tractor had a ground pressure of 1.18 psi and the rear tractor a ground pressure of 1.22 psi. Thus, the vehicle is extremely light for its strength and capabilities so that it can negotiate very swampy ground as well as firm ground without forming ruts in or breaking up the ground so as not to be undesirable from an environmentalist's standpoint.

Figures 6, 7, 8, 9, 10:
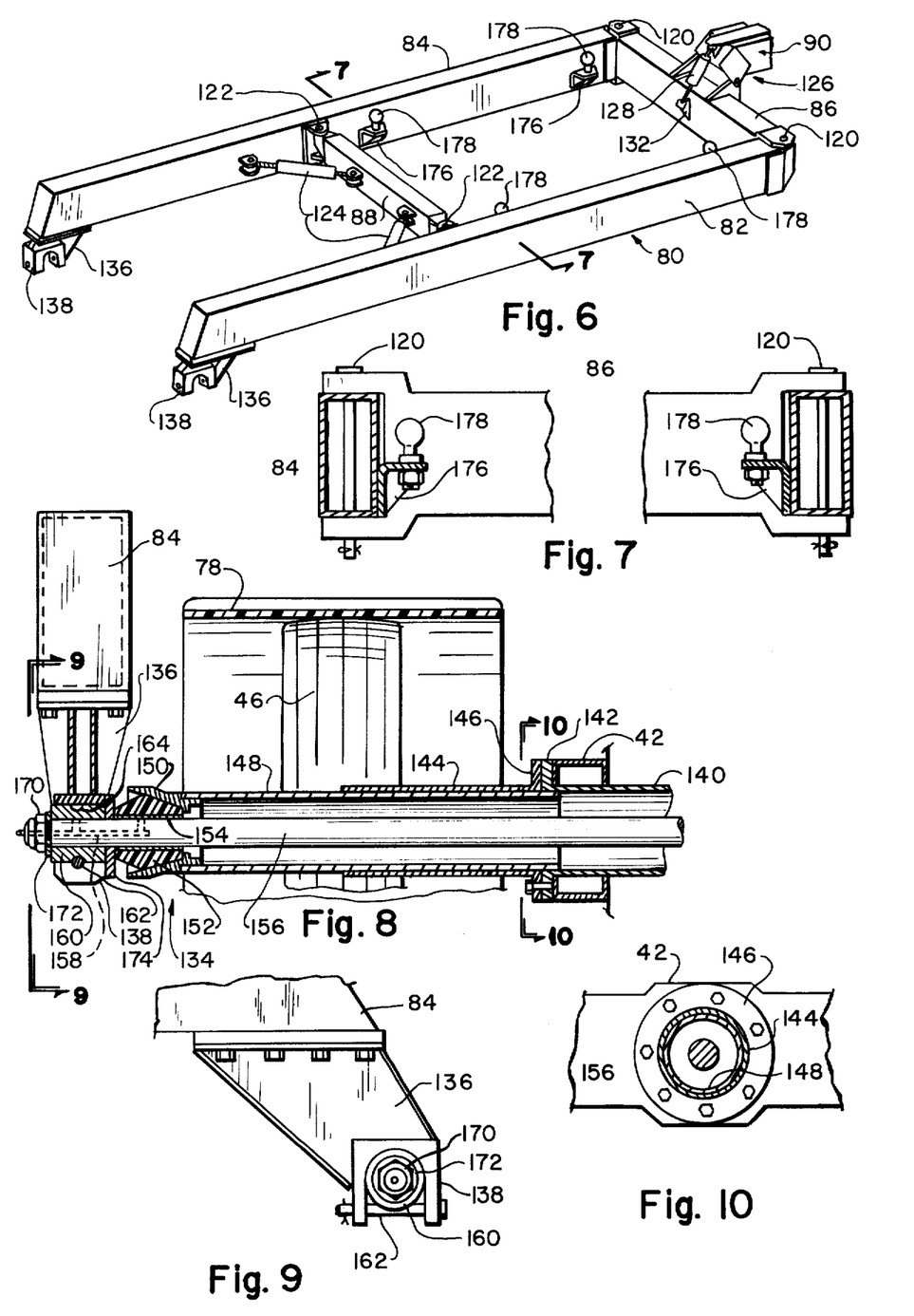
FIG. 6 is a perspective view of the rear portion of the main frame of the vehicle of FIG. 1.
FIG. 7 is an enlarged fragmentary section taken along line 7—7 of FIG. 2.
FIG. 8 is an enlarged fragmentary section taken along line 8—8 of FIG. 2.
FIG. 9 is an enlarged fragmentary side elevation showing the connection between the main frame and the transverse pivot axis of the rear tractor.
FIG. 10 is a section taken along line 10—10 of FIG. 8.
Figure 11:
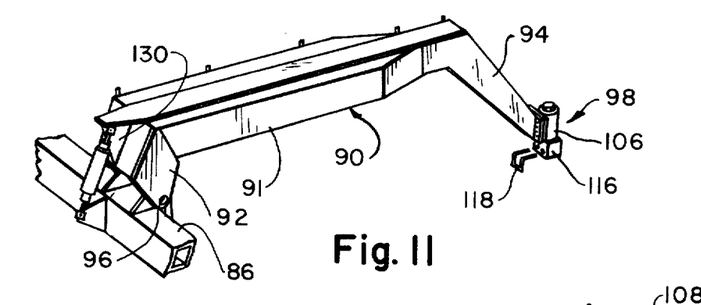
FIG. 11 is a perspective view showing the forward boom portion of the main frame.
Figure 12:
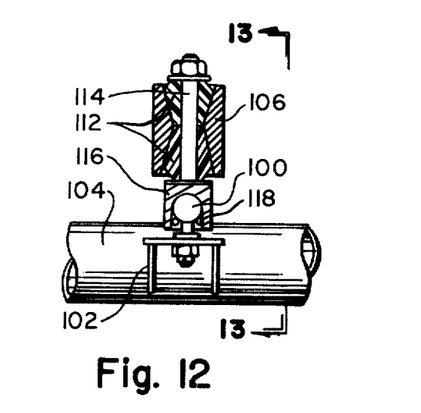
FIG. 12 is an enlarged section taken along line 12—12 of FIG. 2.
Figure 13:
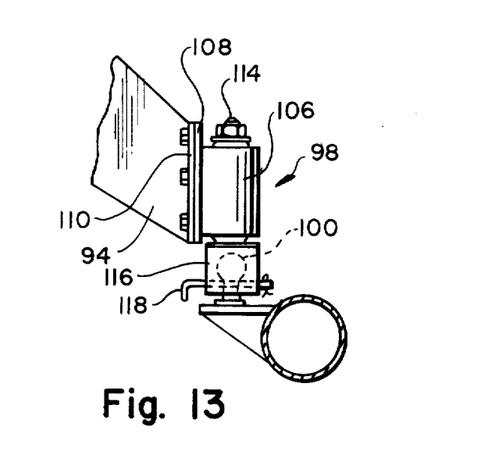
FIG. 13 is a section taken along lines 13—13 of FIG. 12.

The tractors 32 and 34 are interchangeable components of the seismic vehicle 30 whereby either may be used as the front tractor and either as the rear tractor. Both, are, therefore, adapted to be attached to the forward or rearward portion of the main frame 36. The main frame 36, as best seen in FIG. 6, includes a rear bed portion 80 defined by two side frame members 82 and 84, a forward cross member 86 and an intermediate brace member 88. As will be explained later, the main frame functions to support the operations unit 38 on the vehicle as well as the vibrator assembly 40. As shown in FIGS. 1 to 4 and 11, a forwardly extending boom 90 has a raised horizontally extending body portion 91, a rear arm portion 92 inclining downwardly from the rear of the body, and a forward, downwardly inclined arm portion 94 that is pivotally connected by a connector pin 96 at the lower extremity of the arm 92 to the cross member 86. The forward end of the arm 94 has a shock absorbent mounting 98 for a female socket portion of a ball hitch adapted to be received on and connected to a ball 100 anchored on a bracket 102 on a transverse frame member 104 of the base frame 42 of the front tractor. Both tractors are provided with a ball 100 so that the tractors are interchangeable. The mounting 98, as shown in FIGS. 11 to 13, includes an outer, substantially cylindrical sleeve 106 secured to an attachment plate 108 which is bolted to a flat plate 110 on the end of the arm 94. The sleeve 106 has frustoconical inner surfaces which mate with a pair of rubber plugs 112 that are held in place by an anchor rod 114. The anchor rod is secured to the top of the socket portion 116 of ball hitch. When the socket portion 116 is received on the ball 100, a substantially U-shaped connector pin 118 is passed horizontally through spaced openings in the socket portion to retain the socket portion on the ball. The ball 100 is positioned at the center of gravity of the tractor so that the weight of the main frame 36 and the components supported thereon do not cause the tractor to rest in a forwardly or rearwardly pitched position.

Again, the main frame 36 is seen in some detail in FIG. 6, and preferably the side frame members 82 and 84 are pivotally connected to opposite ends of the cross member 86 at 120 and to opposite ends of the brace member 88 at 122 so that the bed portion 80 of the main frame can folded into an oblique angled parallelogram defining a relatively narrow unit for transportation purposes. In other words, the side frames 82 and 84 are free to pivot inwardly about the members 86 and 88. In use, however, the bed portion of the main frame is normally rigidly held or fixed in its right-angled operation configuration, shown in FIG. 6, by ty-rods 124 connected across the corners formed between the side members 82 and 84 and the brace member 88. The ty-rods 124 can be manually extended or retracted to selected fixed positions to effect folding or unfolding movement of the bed portion of the frame. The forwardly extending boom portion 90 of the main frame is pivotally attached to a bifurcated bracket 126 on the cross member 86 and the relative angular position of the boom portion with respect to the bed of the main frame is regulatable by a turn buckel 128, which is manually operated, interconnecting a rearward upper extension bracket 130 of the boom with a bracket 132 welded to the cross member. It can thus be appreciated that extension or retraction of the turn buckel 128 will cause the frame in the vicinity of the cross member 86 to be elevated or lowered, respectively, so that the ground clearance of the vehicle can be altered to adapt to various terrain conditions.

The side frame members 82 and 84 of the main frame are adapted to connect with lateral extensions 134, FIG. 8, from the base frame 42 of the rear tractor 34. The connection is best illustrated in FIGS. 8–10 wherein it can be seen that a bracket 136 is bolted to the underside of the terminal end of each side frame member 82 and 84 and has a downwardly opening, generally U-shaped socket 138. The base frame 42 of the tractor is provided with a transversely extending tubular member 140 having an outwardly facing circular flange 142 at each end. The circular flange 142 is provided with circumferentially spaced threaded holes so that the lateral extension member 134 can be bolted thereto. The lateral extension member has a shortened tubular portion 144 with a circular flange 146 on its inner end with circumferentially spaced openings corresponding to the threaded openings in the flange 142. An inner hollow cylinder 148 is disposed within the shortened tubular portion 144 and is welded thereto so as to provide an extension of the shortened tubular portion and protrude outwardly to approximately the outermost edge of the track 78 on the tractor. A socket plug 150 is secured in the outermost end of the hollow cylinder 148 and has a retaining socket adapted to receive a rubber insert 152 provided with an internal cylindrical bearing 154. A transverse support shaft 156 with a lubricating passage 158 passes through the cylindrical bearings 154 and 160 on each side of the tractor and extends outwardly from each bearing to provide an attachment location for the U-shaped socket 138 on the brackets 136 at the ends of the side frame members of the main frame. The sockets 138 fit down over bearings 160 on the exposed ends of the transverse support shaft 156 and are secured thereto for relative pivotal movement about the shaft by a connector pin 162 which passes through aligned openings in the bracket and rest in annular grooves 164 in the outer surface of the bearings 160. A nut 170 in threaded onto the outer end of the support shaft 156 to prevent any possibility of the bracket from sliding off the end of the support rod, and washers 172 and 174 are provided between the nut and the bearing 160 and between the bracket and the rubber plug, respectively, to reduce undue frictional wear and provide preload for item 152. It can thus be seen that the support shaft serves as a transverse pivot shaft about which the main frame 36 is free to pivot whereby the rear tractor is free to pitch independently of the main frame. The rubber insert 152 absorbs a good portion of the shock forces received by the pivot shaft when the vehicle is traversing unusually rough terrain. It is important to note that the support shaft 156 passes beneath the ball 100 and, therefore, through the center of gravity of the tractor so that the weight of the main frame and the components supported thereby do not cause the tractor to rest in a forwardly or rearwardly pitched position. It will be appreciated that the lateral extensions 134 can easily be removed from or attached to a tractor so that either tractor disclosed as part of the seismic vehicle can be installed as the rear tractor by bolting the lateral extensions to the base frame of the tractor. The extensions, of course, could be left on each tractor so that they would always be equipped to exchange inasmuch as the extensions do not hamper the operation of the tractors.

Figure 18:
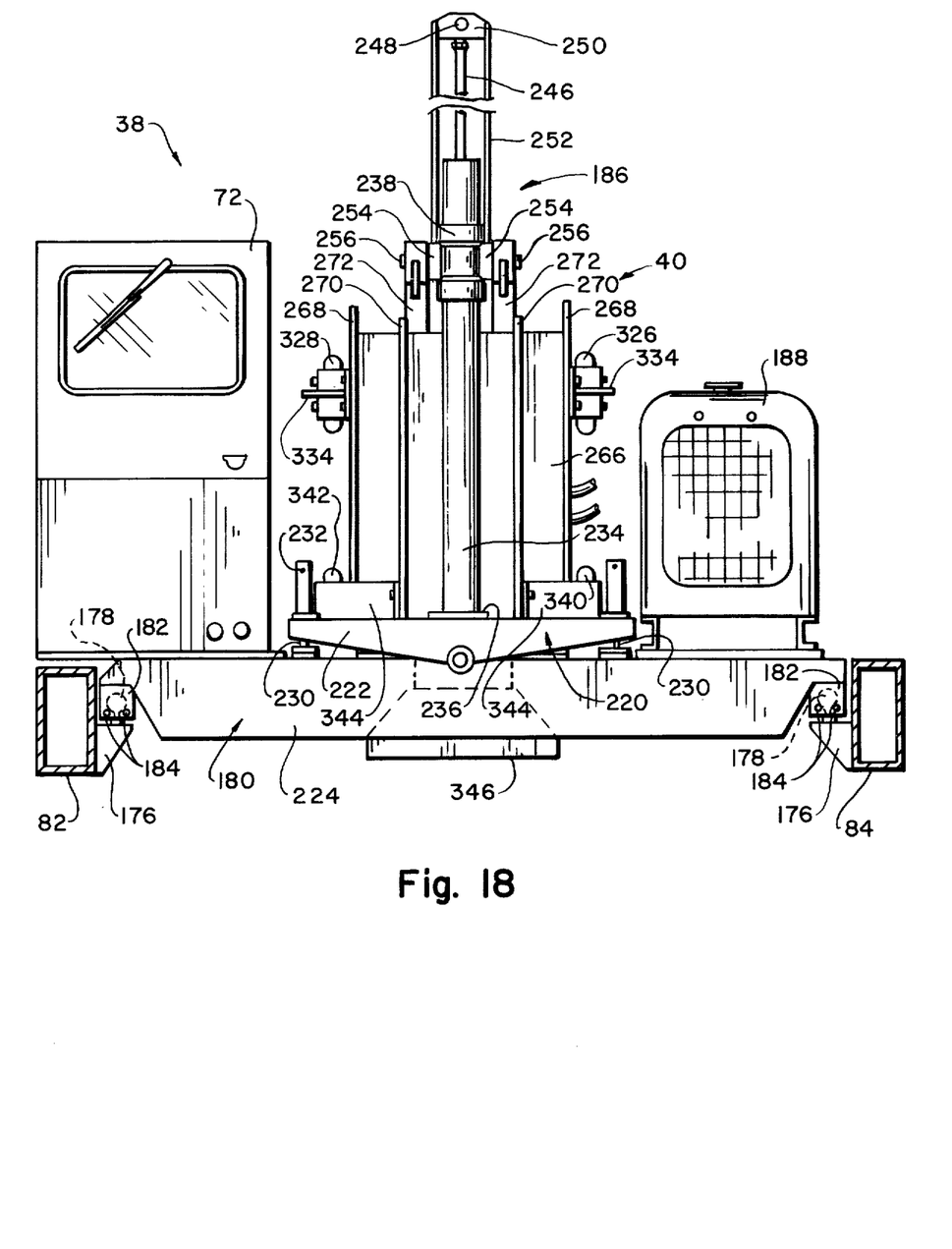
FIG. 18 is an enlarged transverse vertical section through the main frame of the seismic vehicle showing the operations unit mounted thereon.

As is best seen in FIGS. 6, 7 and 18, the side frame members 82 and 84 of the main frame have inwardly directed brackets 176 on their inner surfaces adapted to support the ball portion 178 of ball hitches whereby the frame 180 of the operations unit 38 of the seismic vehicle, which has socketed portions 182 adapted to fit down over the balls 178, can be retained on the main frame 36. U-shaped connector pins 184 pass through the socket portion 182 of the frame 180 to anchor the frame to the balls.

The frame for the operations unit 38 supports the control cab 72, a hoist assembly 186 for the vibrating assembly 40, an engine 188 for driving the hydraulic system which operates the vibrating assembly, and the main fuel tank 190 for the vehicle which also supplies fuel to the engine 188 for the vibrating assembly as well as the engines 62 on each of the tractors as will be discussed in more detail later. It should be pointed out, however, that each tractor is provided with a reserve tank 192 so that it is capable of operation independently of the main frame on which the main fuel tank 190 is disposed.

Figure 14:
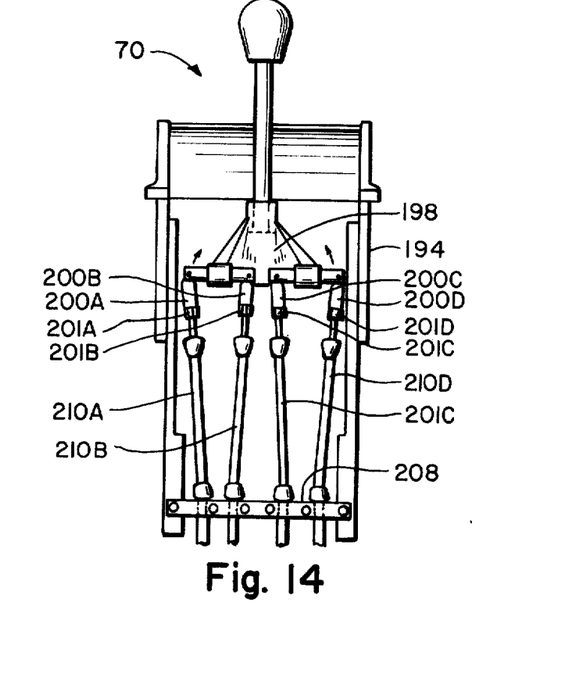
FIG. 14 is an enlarged diagrammatic transverse vertical section taken through the control member on the control cab.
Figure 15:
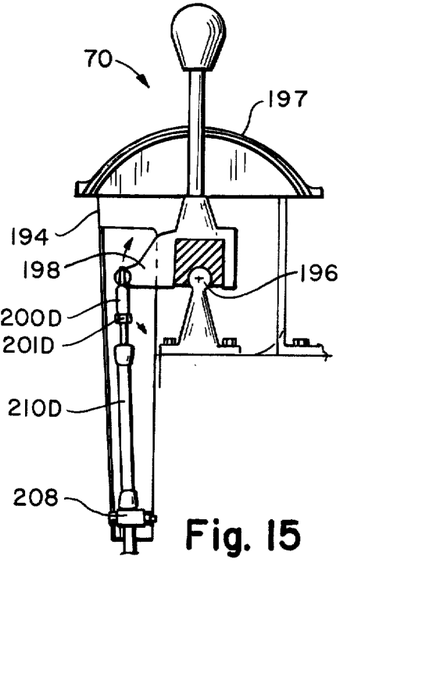
FIG. 15 is an enlarged diagrammatic longitudinal vertical section of the control stick shown in FIG. 14.
Figure 19:
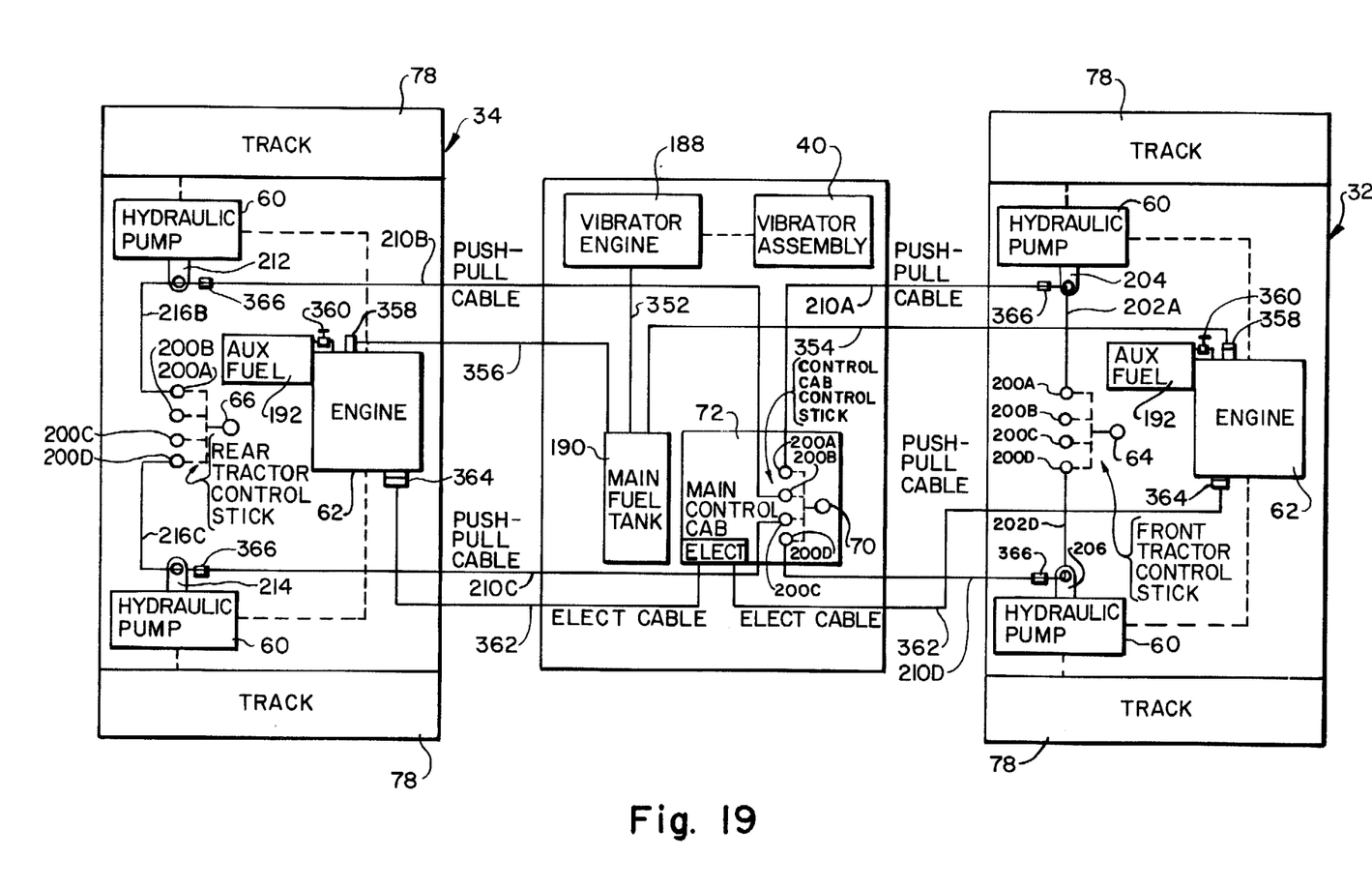
FIG. 19 is a schematic representation of the control system of the seismic vehicle of FIG. 1.

The vehicle can be controlled from any one of three control stations whereby greater versatility is obtained. As mentioned previously, the front and rear tractors are provided with control sticks 64 and 66, respectively, for operation of the associated tractor; and in addition the control sticks on each tractor are connected to the control stick 70 in the control cab in a manner such that operation of the vehicle can be controlled from either tractor or from the control cab. As shown in FIGS. 14 and 15, each control stick is mounted in a housing 194 so as to be universally movable about a universal connection 196 through an open slotted inner portion (not seen) in an arcuate cover plate 197 across the top of the housing 194. A bracket 198 on the control stick extends horizontally away from the universal connection and is provided with four horizontally displaced connection links $200_A$, $200_B$, $200_C$ and $200_D$ each having an adjustable push-pull rod connector $201_A$, $201_B$, $201_C$ and $201_D$, respectively. On the front tractor, the outermost connection links $200_A$ and $200_D$ are connected to push-pull cables $202_A$ and $202_D$, and the innermost connection links $200_B$ and $200_C$ are left unconnected. The rods $202_A$ and $202_D$ extend downwardly from the control stick to lever arms 204 and 206, respectively, as represented in FIG. 19, associated with the hydraulic pumps for the front tractor for regulating the pumping rate of the pump. Each pump is associated with a hydraulic system that is operable to reversibly drive each track of the tractor independently of the other tracks. Sleeves for the push-pull cables are anchored to a horizontal bracket 208 connected to the housing 194 for the control stick whereby any movement of the stick affects a pushing or pulling movement of the cables within the sleeves so that the lever arms on the associated hydraulic pumps are correspondingly moved to accelerate or retard the pumping action and thus correspondingly control the direction and speed of movement of the associated track 78.

The control stick 70 in the control cab has the outermost connection links $200_A$ and $200_D$ connected to push-pull cables $210_A$ and $210_D$, respectively, which are also connected to the lever arms 204 and 206 on the hydraulic pumps 60 of the front tractor 32. The innermost connection links $200_B$ and $200_C$ on the control stick 70 are connected to push-pull cables $210_B$ and $210_C$, respectively, on the hydraulic pumps for the rearward tractor 34. Looking specifically at FIG. 14 wherein the control cab control stick 70 is viewed from a direction looking forwardly out of the control cab, it will be seen that if the control stick is pivoted to the left, the outermost push-pull cable $210_D$ to the right will be pulled upwardly and the outermost push-pull cable $210_A$ to the left will be pushed downwardly so that the pumps 60 associated with the respective push-pull cables will be oppositely affected. It can thus be seen that pivotal movement of the control stick 70 to the left will cause the left track of the front tractor to move in one direction in response to the downward movement of the connection link $200_A$, and the right track of the front tractor to move in an opposite direction in response to the upward movement of the connection link $200_D$, so as to effect a differential turning movement of the front tracks. The push-pull cables are of course connected to the lever arms on the pumps so that a leftward pivotal movement of the control stick will cause the left track of the front tractor to move in reverse and the right track of the front tractor to move forwardly whereby the tractor will turn to the left. An opposite result is, of course, obtained by pivotal movement of the control stick to the right. Pivotal movement of the control stick forwardly, which would be to the right as viewed in FIG. 15, will cause all connected cables $210_A$, $210_B$, $210_C$, and $210_D$ to be pulled equivalently and thus the associated tracks to move forwardly at the same speed to impart forward movement to the tractor. Conversely, pivotal movement of the control stick rearwardly, or to the left as viewed in FIG. 15, will effect rearward movement of the tracks. Various degrees of both forward and lateral pivotal movement of the control stick will impart various degrees of forward turn of the tractors. The same is true with respect to rearward movement when the control stick is pivoted both rearwardly and laterally so that each tractor is capable of maximum mobility. The rear tractor 34 when operated independently or as part of the seismic vehicle would have its control stick connected to its hydraulic pumps in the same manner as described heretofore with regard to the front tractor. Each tractor is provided with relatively small diameter bleed lines having adjustable differential bleed valves, which are not shown, that connect the hydraulic systems associated with each track whereby the pressure in the hydraulic system for each track can be equalized by opening the valves. In operation of a tractor independently of the entire vehicle, the valves would be closed to allow each hydraulic system to operate independently of the other, but when the vehcile is assembled with front and vehicle tractors, the bleed valves for the rear tractor are selectively opened to allow pressure equalization in the hydraulic systems for each track so that each track will move smoothly through turns. The bleed lines are small enough to limit the amount of hydraulic fluid flow but are of sufficient size to equalize pressure between the hydraulic systems of each track.

When the seismic vehicle is assembled as shown in FIGS. 1–4, the three control sticks are operatively connected so that the vehicle can be driven from the control cab or from the tractors. From the foregoing description it will be appreciated that movement of any one of the three control sticks will cause a similar movement of the two remaining control sticks and will control operation of each of the hydraulic pumps 60 associated with the four tracks 78 of the vehicle. It will be readily understood, however, that lateral pivotal movement of any control stick will cause the outermost connectors on the control sticks to move greater distances than the innermost connectors so that when the vehicle is turning, the tracks of the rear tractor 34 will move at a reduced speed in relation to the tracks of the front tractor 32. However, straight forward or rearward pivotal movement of the control sticks will effect identical movement of the front and rear tractors so that the tracks of each vehicle is capable of automatically and smoothly negotiating relatively sharp turns by having the tracks on the front tractor 32 move at accelerated rates relative to the corresponding tracks on the rear tractor 34 so that the front tractor turns quicker than the rear tractor as desired.

Figure 5:
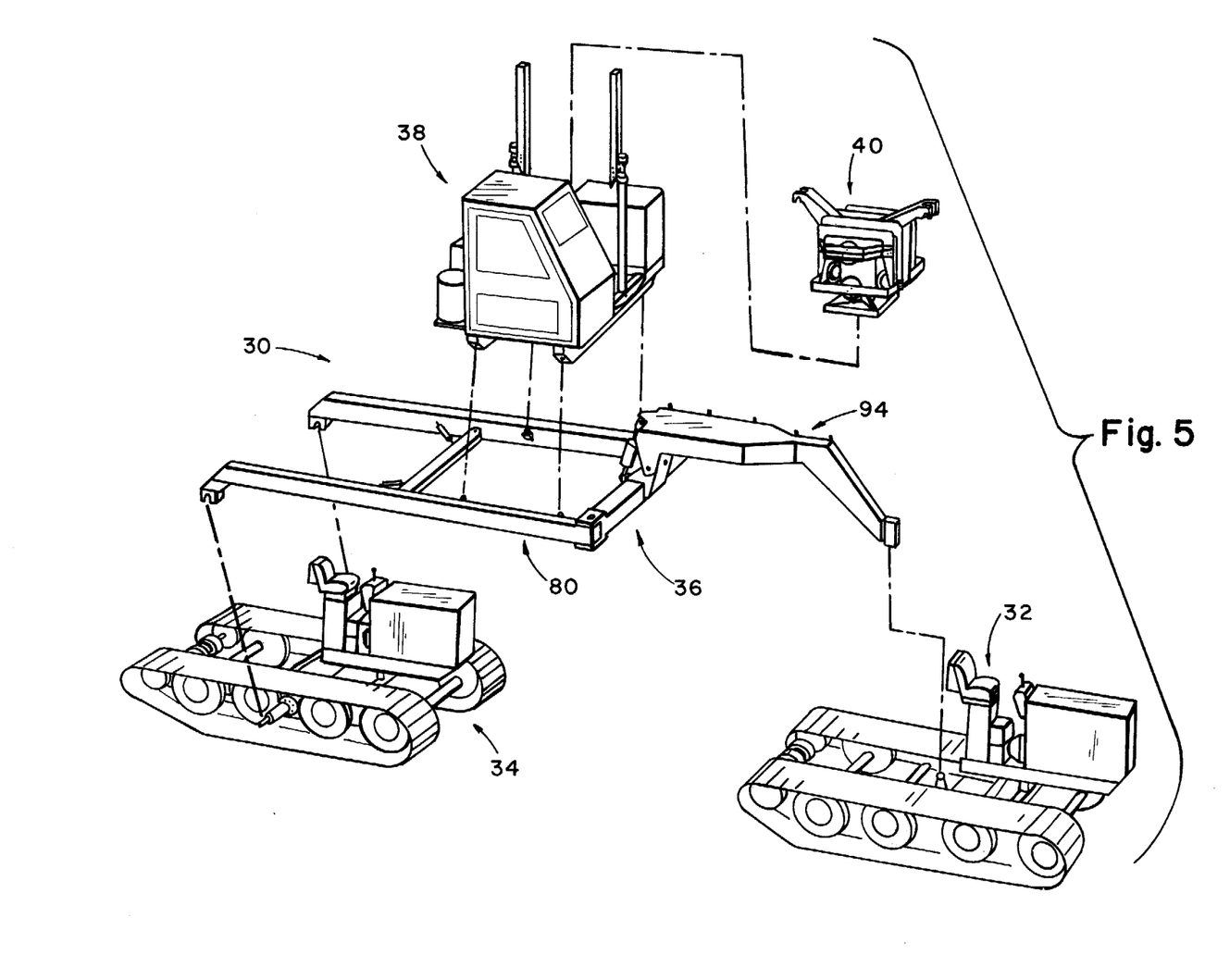
FIG. 5 is an exploded view of the seismic vehicle of FIG. 1 showing the five basic components of the vehicle.
Figure 16:
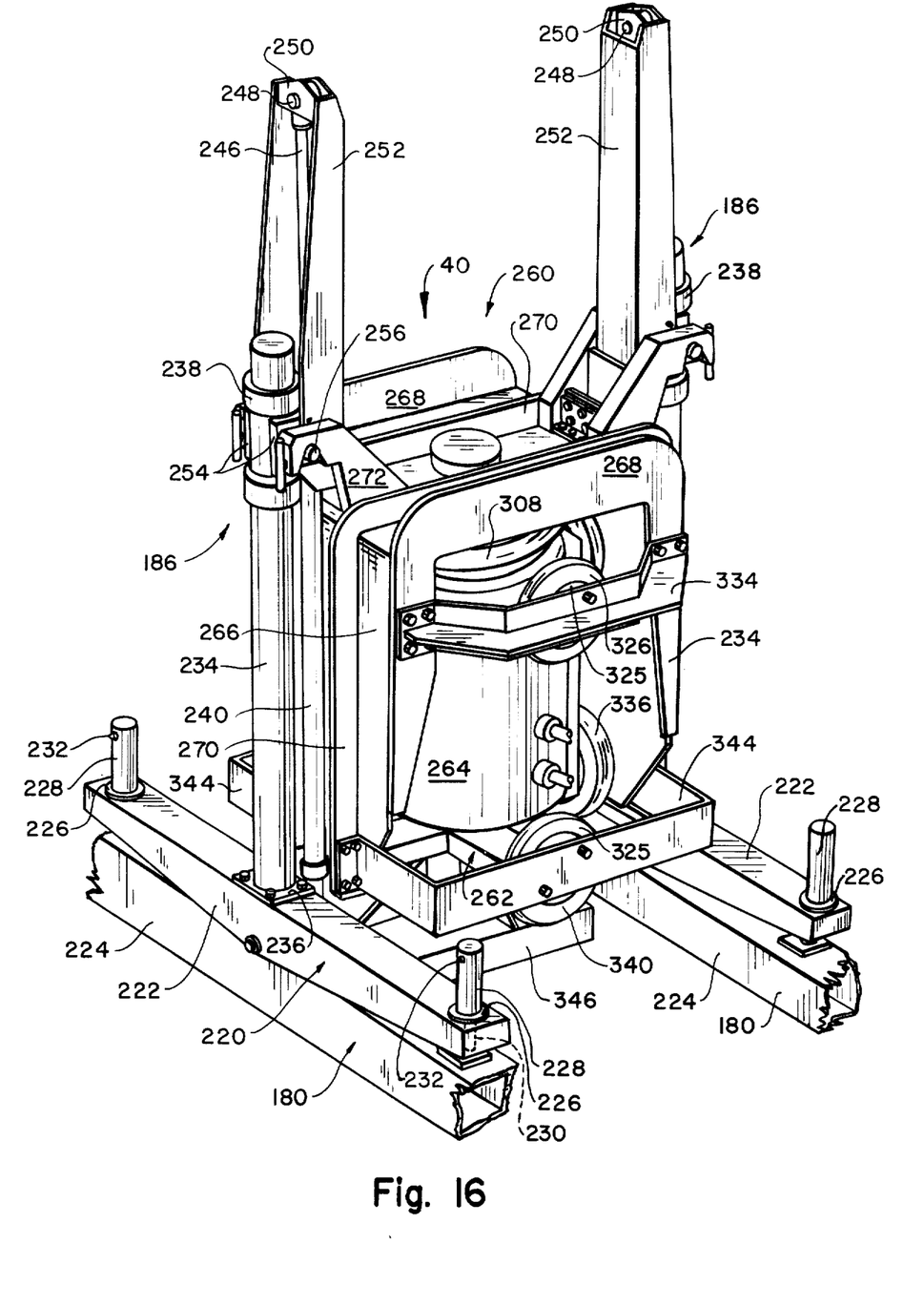
FIG. 16 is an enlarged fragmentary perspective showing the vibrating assembly of the vehicle of FIG. 1.

Referring now to the preferred form of vibrator assembly 40 and its relation to the seismic vehicle as a whole, it will be seen in FIGS. 5 and 18 that the frame 180 for the operation unit is provided with a space adjacent the control cab 72 for the vibrator assembly. The vibrator assembly is carried by a rocker frame 220, FIGS. 16 and 18, which has two substantially triangular shaped rocker arms 222 each having its apex directed downwardly and in contact with a transversely extending frame member 224 of the operations unit frame 180. The end of each rocker arm 222 has a fitting 226 on which a grease cylinder 228 is mounted so that the piston rod 230 of the cylinder extends downwardly through a passage in the rocker arm and is in contact with the associated transverse frame member 224 of the operations unit. The grease cylinders 228 are of the type wherein the piston rod is biased to remain retracted in the cylinder but grease injected with a grease gun into the cylinder through a grease fitting 232 at the upper end of the cylinder will force the piston rod out of the cylinder and, as will be appreciated from FIGS. 16 or 18, will cause the associated rocker arm 222 to pivot about its apex to thereby vary the angular orientation of the rocker arm relative to the frame 180. In this manner, the rocker frame can be tilted for side hill operations of the vibrator assembly to increase stability and prevent the vehicle from shifting during operation of the vibrator.

Figure 17:
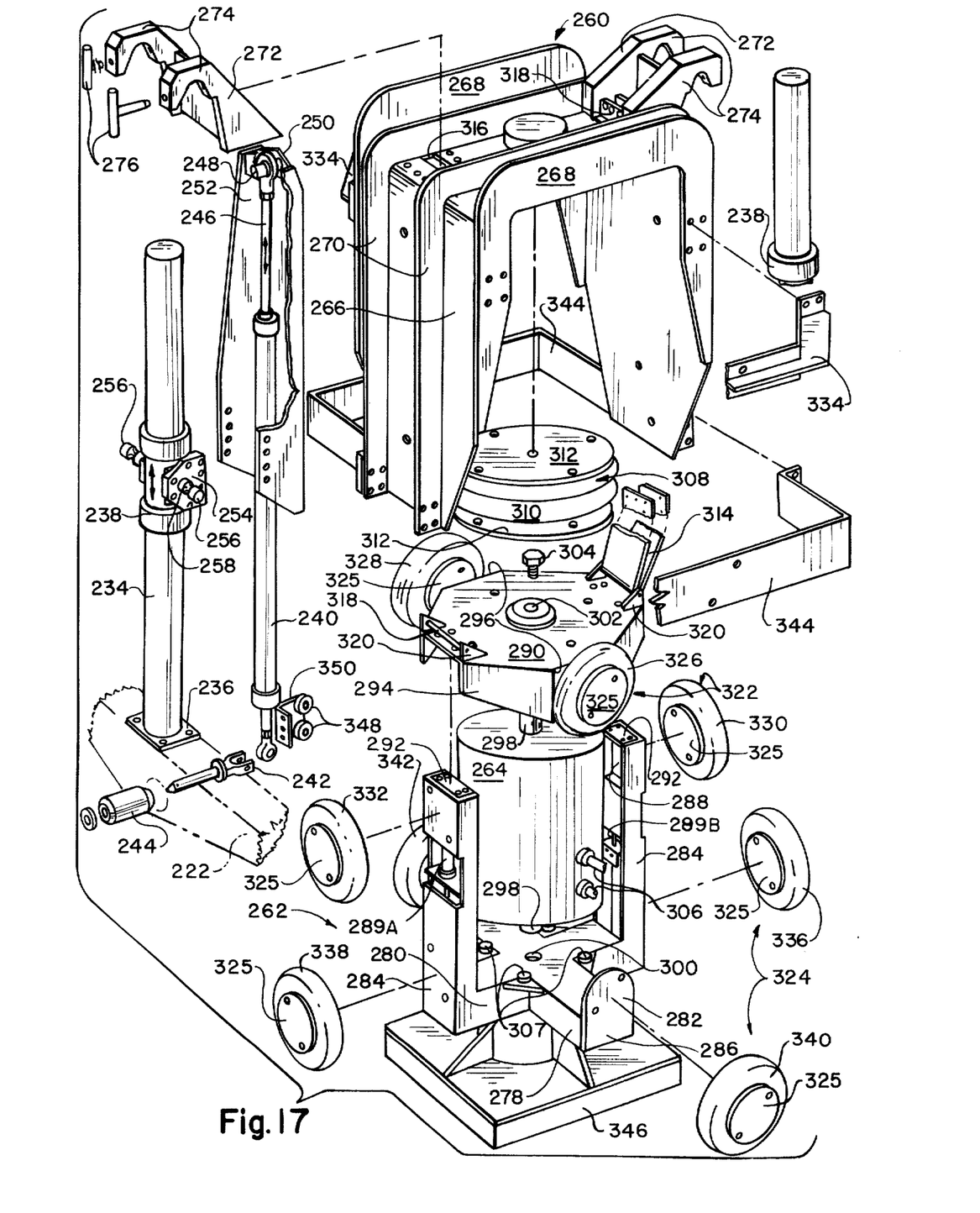
FIG. 17 is a fragmentary exploded perspective of the vibrator assembly shown in FIG. 16.

Secured at the longitudinal center of each rocker arm 222 on the top surface thereof is a vertical guide post 234 having a base plate 236 that is bolted to the top of the rocker arm. A slide member 238 which will be described in more detail later is disposed on the guide post for vertical reciprocal movement. A double-acting lift cylinder 240 associated with each guide post 234 is supported on a bracketed pin 242, FIG. 17, which is received in a rubber bearing shock mount 244 embedded in an associated rocker arm near its apex. The outer ends of each rod 246 for the lift cylinders are journaled on a horizontal pin 248 in a bracket 250 mounted on the upper end of a channeled cylinder guard 252. The cylinder guard is bolted to flattened side plates 254 which are bolted on diametrically opposed sides of the slide member 238. It will thus be appreciated that vertical movement of the piston rod 246 of the lift cylinder will impart a corresponding vertical movement to the cylinder guard 252 which in turn will cause the slide member 238 to move up and down on each of the slide members are provided with normally extending lift pins 256 having an annular groove 258 therein for a purpose to be described later.

The lift assembly just described is adapted to move the vibrator assembly 40 between a raised transportation position and a lowered operating position wherein the vibrator assembly is disposed in engagement with the earth's surface to transmit seismic waves into the earth. The vibrator assembly is provided with outer and inner frames 260 and 262, respectively, that are separated by air bags so that vibrational forces generated by a vibrating mass 264 mounted on the inner frame will be substantially isolated from the outer frame member and the rest of the vehicle and concentrated more nearly in a downward vertical direction into the earth.

The outer frame 260 includes an inverted U-shaped steel plate 266 having spaced gusset reinforcements comprising outer gussets 268 which are disposed along the lateral edges of the inverted U-shaped plate 266, and inner reinforcement gussets 270 which are spaced inwardly from the outer gussets in parallel relationship thereto. The two inner gussets define a channel therebetween in which the lift cylinders 240 are disposed. Bracket pairs 272 are anchored to the top of the inverted U-shaped plate 266 between the inner gussets at opposite sides of the plate, each bracket inclining upwardly and outwardly to terminate in a pair of spaced, parallel, inverted U-shaped arms 274 adapted to fit over the lift pins 256 on the slide members. Aligned openings are provided in the inverted U-shaped arms 274 for the reception of lock pins 276 which may be inserted into the openings when the brackets 272 are disposed over the lift pins to secure the brackets 272 to the associated slide members. The lock pins 276 will rest in the grooves 258 on the lift pins so that linear movement of the brackets 272 relative to the lift pins is prevented.

The inner frame 262 is a unitized body of steel or the like and includes two mutually perpendicular, U-shaped components 278 and 280. Component 278 has relatively short, upwardly extending legs 282 and component 280 has relatively long upwardly extending legs 284. The short upwardly extending legs 282 define flattened, outwardly facing plates 286 on which vibration dampeners in the form of suspension air bags can be mounted to separate the inner frame from the outer frame. A discussion of the air bags and the manner in which they are connected to the respective frames will be set forth after the description of the inner frame. The relatively long legs 284 are channeled so as to define inwardly opening guide channels 288 which receive a mass linear variable differential transformer 289A and an accelerometer 289B for the vibratory mass. The outwardly facing sides of each of the long legs 284 are substantially flat and are adapted to mount vertically spaced pairs of another set of vibration dampeners defined by suspension air bags. The inner frame 262 also includes an octagonal cover plate 290 which is bolted on end plates 292 on the upper ends of the longer legs 284. The cover plate 290 is provided with downwardly extending flanges 294 comprised of flattened oblique segments which in combination extend around the octagonal side edges of the cover plate 290 except at the sides adapted to receive the upwardly extending legs 284 which are bolted to the cover plate 290. Diametrically opposed segments 296 of the flange, that are disposed ninety degrees from the legs 284, are adapted to mount other air bags.

The vibratory mass 264 may be of the type described in detail in U.S. Pat. No. 3,306,391 issued to M. G. Bays, so that a detailed discussion thereof is not deemed necessary here. Basically, however, the mass is mounted for reciprocatory movement on a vertical shaft 298 which is anchored centrally in the bottom of the inner frame at 300 and in an opening 302 passing through the top of the inner frame. Both ends of the shaft 298 are internally threaded so as to receive bolts 304, only one of which is shown, to secure the shaft to the top and bottom of the inner frame. As is discussed in detail in the aforementioned Bays patent, the mass is caused to reciprocate on the shaft by a hydraulic system connected to the mass by hydraulic hoses 306 in order to impart high frequency vibration to the mass on the shaft. Bumper studs 307 are provided on the inner frame to help keep the mass from becoming uncentered as can be more fully appreciated from the discussion in the aforementioned Bays patent.

In order to maximize the force with which the vibrator produces seismic waves in the earth, it is important to minimize the weight that must be lifted with each reciprocating stroke of the mass; otherwise, energy is lost in unnessarily moving heavy components of the vehicle. For this purpose, a unique arrangement of air bags is utilized to isolate the inner frame 262 of the vibrator assembly, and wherein the air bags are strategically positioned about the inner frame to hold the inner frame down and also to prevent horizontal and oscillatory forces from altering the desired path of movement of the mass.

More specifically, a first main air bag 308 is anchored to the underside of the U-shaped plate 266 of the outer frame and to the top surface of the top 290 of the inner frame. In the preferred form, the air bag comprises an enlarged nylon cord-reinforced inflatable Neoprene rubber bladder 310 with a metal retaining ring around its center to divide it into two vertically aligned toroidal segments. Metal attaching plates 312 are attached to the ends of the bladder for attachment by bolts to the inner and outer frame members of the vibrator assembly. The air bag 308 preferably is of the type sold by Firestone Industrial Rubber Products Company under the trademark "Airide." It will be appreciated that the main air bag 308 urges the inner frame of the vibrator assembly downwardly and will dampen vertical force components to reduce the magnitude of the vertical force components transferred into the outer frame and the remainder of the seismic vehicle. Since the main air bag exerts a downward force from the top of the inner frame, sling straps 314, preferably of Nylon, are provided between the inner and outer frames to prevent the inner frame from moving downwardly beyond a preselected position. The sling straps pass through slotted openings 316 in the U-shaped plate of the outer frame and are fixed therein by adjacent flat plates 318 on the base of the bracket 272. Bolts pass through the plates 318 and the adjacent ends of the sling straps 314 to hold them in position. The sling straps pass downwardly from the outer frame and are looped around bars 318 mounted in brackets 320 on the top of the inner frame.

Upper and lower sets 322 and 324, respectively, of four circumferentially spaced air bags separate the inner and outer frames to dampen horizontal as well as oscillatory force components created by the vibrating mass. Each air bag in a set is displaced 90° from an adjacent air bag so that all horizontal and oscillatory forces are substantially absorbed by the air bags. Each of the air bags in the upper and lower sets is similar to the main air bag 308 except that it is smaller and does not have the metal ring to separate the tire into toroidal segments. Again, the tires 322 and 324 are preferably nylon cord-reinforced inflatable Neoprene bladders with metal plates 325 secured on either side and they too may be of the type sold by the Firestone Rubber Products, Co. under the trademark Airide. The upper set of air bags 322 is mounted on the inner frame with two of the air bags 326 and 328 attached to diametrically opposed segments 296 of the outer face of the flange 294 on the top of the inner frame and with the other two air bags 330 and 332 mounted on the outer surface of the upper ends of the long legs 284 of the inner frame. The outer metal plate of the air bags 326 and 328 on the top of the inner frame are secured to the outer frame by brackets 334 which are anchored to and extend forwardly and rearwardly from the side gussets 268 on the outer frame. The air bags 330 and 332 mounted on the upper ends of the long legs 284 of the inner frame have their outwardly facing metal plates anchored to the inner surface of the U-shaped plate 266 of the outer frame.

The lower set 324 of air bags is mounted so that two of the air bags 336 and 338 are secured to the outer face of the lower portion of the long legs 284 and the other two air bags 340 and 342 are secured to the outer face of the short legs 286 of the inner frame member. The air bags 336 and 338 mounted on the lower ends of the long legs are bolted to the inner surface of the inverted U-shaped plate 266 of the outer frame and the air bags 340 and 342 mounted on the short legs have their outwardly facing metal plates secured to brackets 344 on the outer frame which are bolted to the inner gussets 270. It will be appreciated that with the aforedescribed arrangement, the inner frame 262 is air suspended from the outer frame 260 by the two vertically spaced sets 322 and 324 of the air bags dampening horizontal and oscillatory force components and by the main air bag 308 which dampens vertical and oscillatory force components. The vertical spacing of the upper and lower sets of air bags for damping horizontal and oscillatory force components provide a plurality of couples that encounter oscillatory or twisting tendencies of the mass. It can, therefore, be seen that any movement of the vibrator mass and consequently the inner frame will be damped by the air bags so that only minimal force components will be transmitted into the outer frame and the ramainder of the vehicle. It will also be appreciated that with the aforedescribed system of isolation that the vibrating mass 264 will remain centered so as to direct the force vibrations directly into the earth regardless of surface variations at the location of operation. A base plate 346 is bolted to the bottom surface of the inner frame so that the vertical force components created by the vibrating mass will be transmitted directly into the base plate and subsequently into the earth. The releasable attachment of the base plate to the inner frame enables quick changing of base plates os that large base plates can be attached for swampy terrain and smaller base plates for solid surfaces.

As mentioned previously, the entire vibrating assembly 40 including the inner and outer frames and the vibrating mass can be elevated into a transportation position by the extension of the lift cylinders 240 or lowered into an operational position by retraction of the lift cylinders. This can all be done very rapidly with the hydraulic system of the vehicle so that the vehicle is capable of producing seismic waves at one location and then quickly lifting the vibrating assembly and moving the vehicle to a second location where the vibrating assembly can again be lowered to its operational position. If the vehicle begins to move before the base plate 346 has been lifted from the ground or if the base plate contacts the ground before the vehicle comes to a complete stop, the air bags will damp the consequent oscillatory movement of the inner frame thereby preventing damage to the system. To prevent the outer frame from damaging the lift cylinders 240 during upward and downward movement of the outer frame, a pair of rollers 348 are mounted on brackets 350 anchored to the inner surface of the rocker arms 222 on each side of the assembly so as to roll in engagement with the outer surface of the inverted U-shaped plate 266 on the outer frame member and thereby maintain a fixed spacing between the outer frame and the lift cylinders.

An important feature of the seismic vehicle hereinbefore described is that it can be readily broken down into five basic component parts by the mere removal of connection pins at specified locations about the vehicle. Specifically, the front and rear tractors can be disconnected from the main frame 36 by the pin connector 118 at the front of the main frame and the pin connectors 162 at the ends of the side frame members 82 and 84 of the main frame. The vibrator assembly 40 can be removed from the operations unit 38 by removal of the pins 276 in the brackets 272 on the outer frame so that the entire vibrating assembly can be lifted as by helicopter or crane off the slide members 238. The operations unit 38 can be separated from the main frame 36 by removal of the pin connectors 184 associated with the four ball hitches between the frame of the operations unit and the main frame 36. Each of the five basic separate components of the vehicle; namely, the two tractors, the operations unit, the main frame and the vibrator assembly are of a size and weight that enables it to be independently transported as by air cargo plane or helicopter to distant locations. The assembly and disassembly of the five component parts can be accomplished in less than five minutes with hand tools making the vehicle very adaptable and suitable for use in areas that are unnegotiable by land-roving vehicles. In other words, the vehicle can be disassembled and transported by helicopter into a remote area and assembled at the site of seismic operations with very little effort and in very little time. Also, the basic component parts of the vehicle are readily exchangeable so that if one component part malfunctions, a replacement part can be immediately incorporated for the malfunctioning part so that there is very little down time and vast savings for the operator.

Referring to FIG. 19, a schematic illustration of the control system for the vehicle is shown. Looking first at the control system for the vehicle on the main frame 36, it will be seen that the main fuel tank 190 is directly connected by a fuel line 352 to the vibrator engine 188 and has fuel lines 354 and 356 connected to the engines for the front and rear tractors, respectively, by removable connectors 358 so that the fuel lines can be easily disconnected from the tractor engines. As mentioned previously, each tractor is provided with an auxiliary fuel tank 192 connected thereto by a fuel line with a valve 360 whereby when the tractor engines are connected to the main fuel tank, the auxiliary fuel tank can be disconnected by the valve. When it is desired to operate the tractors independently of the main frame, the fuel line connections 358 can be disconnected and the valves 360 connecting the auxiliary fuel tanks can be opened. It can be seen that the engines for the front and rear tractors are connected by electrical cables 362 to the control cab 72 so that the tractor engines can be shut down from the control cab when desired. The electrical cable connections are also capable of quick disconnect by a connector 364 on each tractor engine. The control stick 64 on the front tractor has its outermost connection links 200$_A$ and 200$_D$ connected by rods to the lever arms 204 and 206 respectively of the hydraulic pumps 60 associated with the left and right tracks of the tractor as discussed hereinbefore. The lever arms 206 and 204 on the hydraulic pumps are in turn connected by push-pull cables to the outermost connecting links 200$_A$ and 200$_D$, respectively, on the control stick 70 in the control cab. The innermost connecting links 200$_B$ and 200$_C$ in the control cab, as discussed before, are connected by push-pull cables to the lever arms 212 and 214, respectively, on the drive pumps 60 of the rear tractor. In turn, the lever arms 212 and 214 on the drive pumps of the rear tractor are connected to the outermost connecting links 200$_A$ and 200$_D$ on the rear tractor control stick 66. As shown, the connections between the control stick 70 in the control cab and the lever arms on the drive pumps of each tractor can be released by the quick-release connectors designated 366 so that when it is desired to operate either tractor independently of the main frame, the push-pull cable connectors can be released. It will thus be seen that in order to separate either of the tractors from the main frame it is only necessary to remove connector pins which tie the main frame to the tractors, as discussed hereinbefore, and to disconnect the fuel lines, electrical cables and the push-pull cables.

Although the present invention has been described with a certain degree of particularity, it is understood that the present disclosure has been made by way of example and that changes in details of structure may be made without departing from the spirit thereof.

What is claimed is:

1. In a seismic vibrator assembly carried by a support structure, said vibrator assembly having a vibrator mass mounted for reciprocal movement in a vertical direction, the improvement comprising an inner frame having means for retaining the mass so that vibrations of the mass will be imparted directly into the inner frame, a base plate secured to the inner frame and adapted to be placed in engagement with the earth whereby vibrations of the mass will be transmitted into the earth, an outer frame anchored to the support structure and having at least a portion thereof surrounding the upper end and sides of said inner frame, and a plurality of vibration damping units interconnecting the inner and outer frames to separate said frames, said damping units including first vibration damping means separating the upper ends of said inner and outer frames whereby to confine the application of vibrational forces generated by the mass to a downward vertical direction of movement and second vibration damping means disposed between the frames in a direction normal to said vertical direction whereby vibrations of the mass will be concentrated along said vertical direction of movement while isolating the vibrations from the outer frame so that the energy transmitted by the mass into the earth is maximized.

2. In a seismic vibrator assembly carried by a support structure, said vibrator assembly having a vibrator mass mounted for reciprocal movement on a substantially vertical shaft, the improvement comprising an inner frame having means for supporting the mass so that vibrations of the mass will be imparted directly into the inner frame, a base plate secured to the inner frame and adapted to be placed in engagement with the earth whereby vibrations of the mass will be transmitted into the earth, an outer frame anchored to the support structure and having at least a portion thereof surrounding the upper end and sides of said inner frame, and a plurality of damping units interconnecting said frames to isolate vibrations of said inner frame from said outer frame, said damping units including a damping unit above the inner frame to dampen vertical vibratory force components created by the vibrating mass, and a plurality of upper and lower damping units at equally spaced intervals around the sides of the inner frame reacting to horizontal vibratory force components created by the vibrating mass whereby the vibrating mass will be maintained for directing high energy force vibrations into the earth and the outer frame will be isolated from the vibratory forces by the damping units.

3. In the seismic vibrator assembly of claim 2, said damping units around the sides of the inner frame being arranged in vertically spaced sets to react against both horizontal and oscillatory forces created by the vibratory mass so that the mass will be retained for reciprocating movement along the substantially vertical direction of the said shaft.

4. In the seismic vibrator assembly of claim 3, there being only two vertically spaced sets of damping units.

5. In the seismic vibrator assembly of claim 4, each of said vertically spaced sets of damping units comprising four damping units equally spaced circumferentially from each other.

6. A seismic vibrator assembly comprising in combination a vibrator mass mounted on a substantially vertical shaft for reciprocating movement, power means for effecting vibratory movement of the mass along the shaft, an inner frame having upstanding legs spaced from and adjacent to the vibrator mass, said inner frame having means for anchoring the shaft for the vibrator mass whereby vibrations of the mass will be imparted into the inner frame, a base plate secured to the inner frame and adapted to be placed in engagement with the earth whereby vibrations of the mass will be transmitted into the earth, an outer frame having portions spaced from and adjacent to the legs of said inner frame, a plurality of pneumatic damping units interconnecting the legs of said inner frame with the outer frame, and a damping unit in alignment with said shaft above the inner frame connecting the inner frame to the outer frame whereby vibratory forces created by said vibratory mass will be isolated from the outer frame by the damping units and the damping units will urge the vibratory mass to undergo a purely reciprocatory movement so that high energy vibratory forces will be directed into the earth to produce desired seismic waves.

7. In the seismic vibrator assembly of claim 2 wherein said pneumatic damping units comprise hermetically sealed rubber-like bladders having a pair of mounting plates secured thereto on opposite sides, said mounting plates being secured respectively to the inner and outer frames so that the inner and outer frames are pneumatically separated.

8. In the seismic vibrator assembly of claim 7 wherein said damping unit above the inner frame has a metal ring extending around the bladder to divide the bladder into two vertically aligned toroidal segments.

9. In the seismic vibrator of claim 2, further including fixed length strap means interconnecting an upper portion of the outer frame with an upper portion of the inner frame to limit the vertical displacement of the upper portions of the inner and outer frames during operation of the vibrator assembly.

* * * * *